(12) United States Patent
Brillant (10) Patent No.: US 9,069,423 B2
(45) Date of Patent: Jun. 30, 2015

(54) BUFFER-REFERENCE SELF-CAPACITANCE MEASUREMENT

(75) Inventor: Gregory Brillant, Trondheim (NO)

(73) Assignee: Atmel Corporation, San Jose, CA (US)

( * ) Notice: Subject to any disclaimer, the term of this patent is extended or adjusted under 35 U.S.C. 154(b) by 590 days.

(21) Appl. No.: 13/414,377

(22) Filed: Mar. 7, 2012

(65) Prior Publication Data

US 2013/0234976 A1    Sep. 12, 2013

(51) Int. Cl.
  *G06F 3/045*  (2006.01)
  *G06F 3/044*  (2006.01)
  *G06F 3/041*  (2006.01)

(52) U.S. Cl.
  CPC .............. *G06F 3/044* (2013.01); *G06F 3/0416* (2013.01)

(58) Field of Classification Search
  CPC ........ G06F 3/044; G06F 3/041; G06F 3/0416
  See application file for complete search history.

(56) References Cited

U.S. PATENT DOCUMENTS

| | | |
|---|---|---|
| 7,663,607 B2 | 2/2010 | Hotelling |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 2009/0315854 A1 | 12/2009 | Matsuo |
| 2011/0074609 A1* | 3/2011 | Lin ................................. 341/33 |
| 2011/0187390 A1* | 8/2011 | Lin et al. ...................... 324/679 |
| 2012/0176179 A1* | 7/2012 | Harders et al. ............... 327/517 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Kenneth B Lee, Jr.
(74) *Attorney, Agent, or Firm* — Baker Botts LLP (57) ABSTRACT

In one embodiment, a method includes modifying an amount of charge of a capacitance of a touch sensor resulting in a voltage at the capacitance being a reference voltage level. The method also includes modifying the amount of charge of the capacitance resulting in the voltage at the capacitance being a first pre-determined voltage level. The modified amount of charge of the capacitance induces a first amount of charge on an integration capacitor and the first amount of charge modifies the voltage at the integration capacitor from an integration-reference voltage level to a first charging voltage level. The method also includes modifying the amount of charge of the capacitance resulting in the voltage at the capacitance being a second pre-determined voltage level. The modified amount of charge of the capacitance inducing a second amount of charge on the integration capacitor.

20 Claims, 5 Drawing Sheets

BUFFER-REFERENCE SELF-CAPACITANCE MEASUREMENT

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
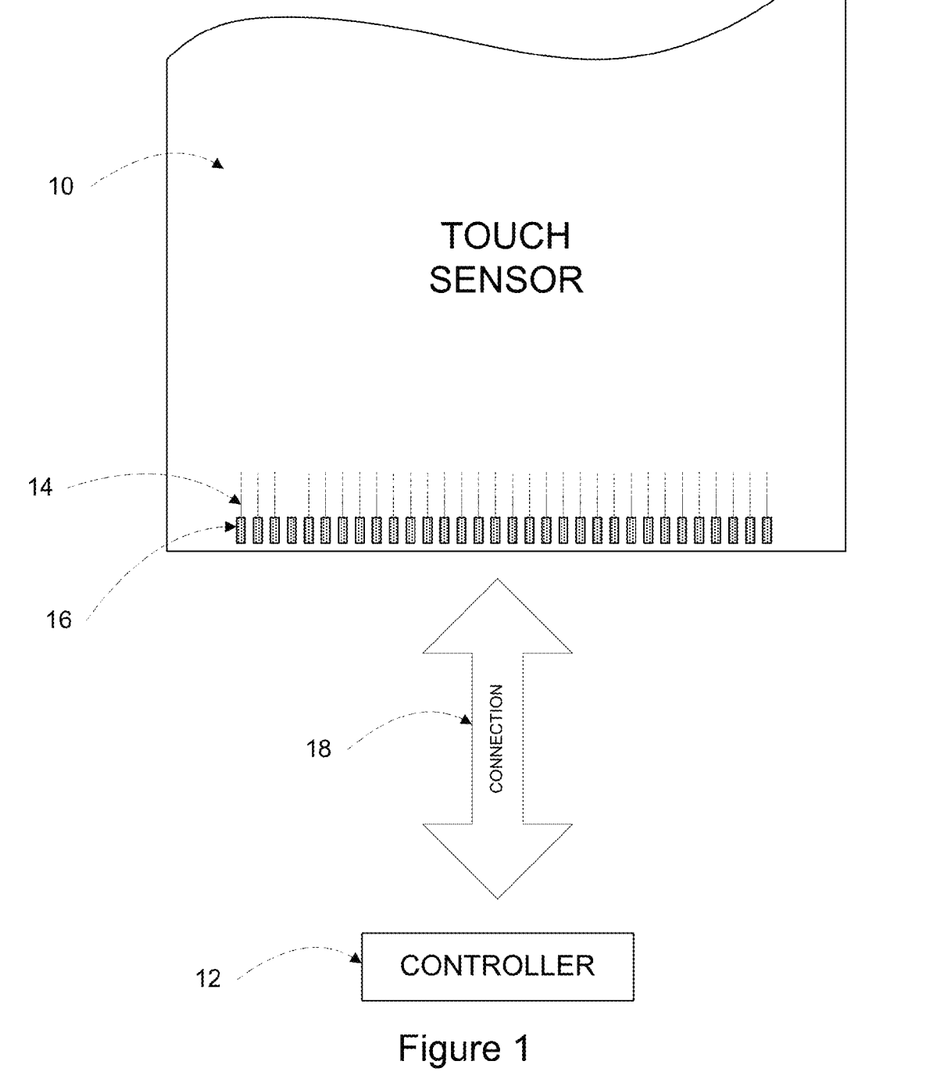
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2A:
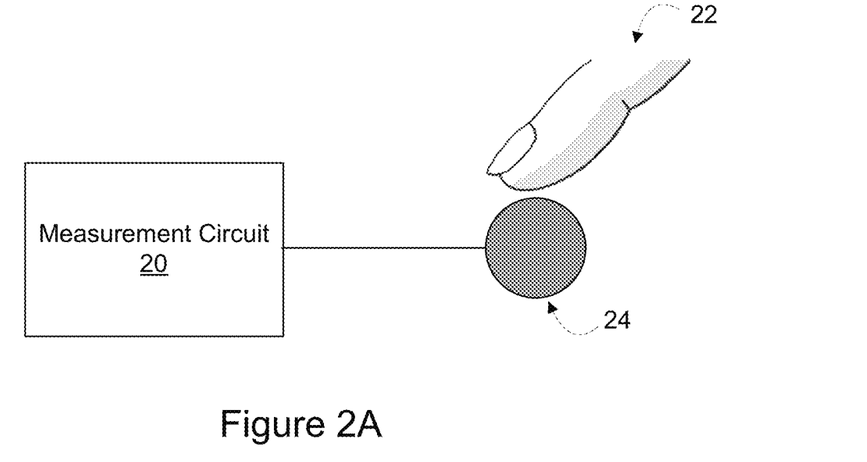
FIGS. 2A-B illustrate a schematic of an example self-capacitance measurement.
Figure 2B:
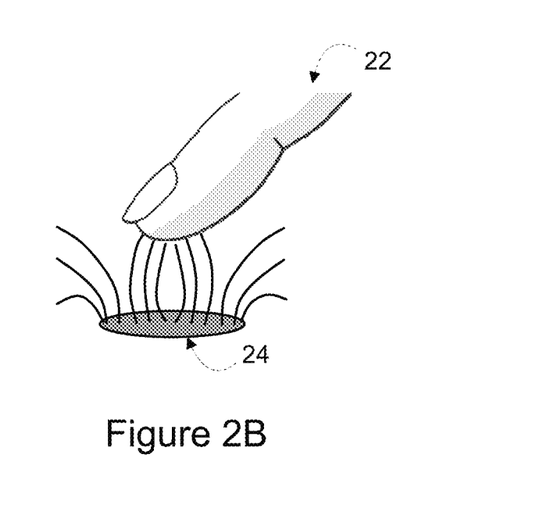

FIGS. 2A-B illustrate a schematic of an example self-capacitance measurement. In the example of FIG. 2A, each electrode 24 of the touch sensor is coupled to a self-capacitance measurement circuit 20. As described above, for self-capacitance measurements, each electrode 24 transmits a drive signal and senses a signal indicative of a touch or proximity input from, for example, a finger 22. In particular embodiments, self-capacitance measurement circuit 20 generates the drive signal transmitted by electrode 24 and senses the capacitance between finger 22 providing the touch or proximity input. In the example of FIG. 2B, the drive signal transmitted by electrode 24 generates an electric field that emanates from electrode 24. The presence of finger 22 effects the electric field sensed and in turn the amount of charge sensed at electrode 24 by self-capacitance measurement circuit 20. As finger 22 approaches electrode 24, the capacitance detected by the self-capacitance measurement circuit 20 coupled to electrode 24 increases. Although this disclosure describes and illustrates the self-capacitance measurement circuit as a discrete circuit, this disclosure contemplates a self-capacitance measurement circuit integrated with the touch-sensor controller or any suitable circuit.

Figure 3:
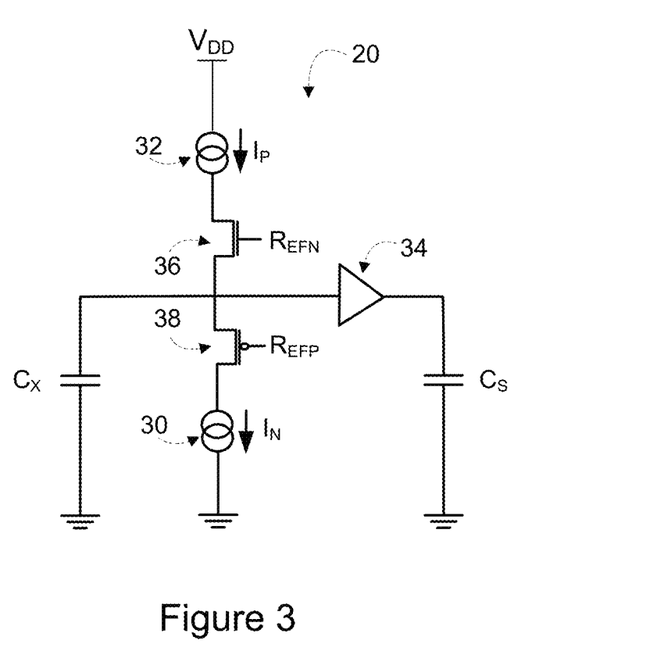
FIG. 3 illustrates an example circuit schematic for self-capacitance measurements.

FIG. 3 illustrates an example circuit schematic for self-capacitance measurements. Self-capacitance measurement circuit 20 determines a change of a touch sensor capacitance schematically illustrated in the example of FIG. 3 by measurement capacitor $C_X$. In particular embodiments, measurement capacitor $C_X$ is formed in part between an electrode of the touch sensor and other conductive material of the touch sensor (not shown) that is capacitively or galvanically coupled to ground. As an example and not by way of limitation, the conductive material of the touch sensor may include portions of tracks, pins, or internal network of the touch sensor. As described above, the electrode of the touch sensor senses the capacitance between the finger providing the touch or proximity input through the electric field transmitted by the electrode.

The portion of measurement capacitor $C_X$ that includes the electrode of the touch sensor is coupled to a current source 32 through a n-type metal-oxide-semiconductor (NMOS) transistor 36. Current source 32 is coupled to a voltage source $V_{DD}$ and is configured to generate a current $I_P$. In particular embodiments, voltage source $V_{DD}$ is a supply voltage of the touch sensor. The electrode portion of measurement capacitor $C_X$ is coupled to a current source 30 through a p-type metal-oxide-semiconductor (PMOS) transistor 38. Current source 30 is coupled to ground and is configured to generate a current $I_N$. In particular embodiments, current source 32 applies charge to measurement capacitor $C_x$ and current source 30 discharges measurement capacitor $C_x$. Measurement capacitor $C_x$ is coupled to an integration capacitor $C_S$ through current amplifier 34. In particular embodiments, the gain of current amplifier 34 is adjustable and the gain may range between positive and negative values. Although this disclosure describes and illustrates a particular arrangement of particular components for the self-capacitance measurement circuit, this disclosure contemplates any suitable arrangement of any suitable components for the self-capacitance measurement circuit. Moreover, this disclosure contemplates any suitable switching devices coupling the current sources to the measurement capacitor, where appropriate.

Figure 4A:
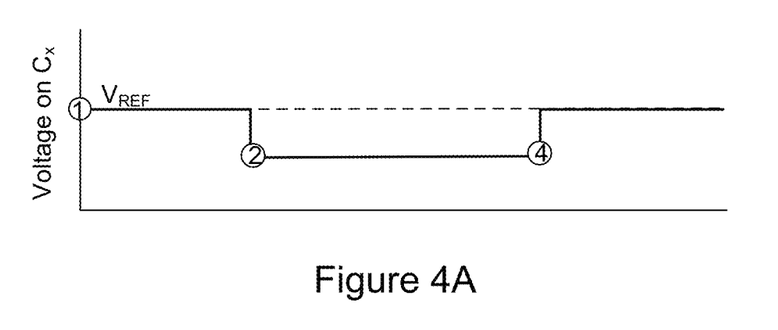
FIGS. 4A-D illustrate example waveforms at a measurement capacitor and integration capacitor over time for an example self-capacitance measurement.
Figure 4B:
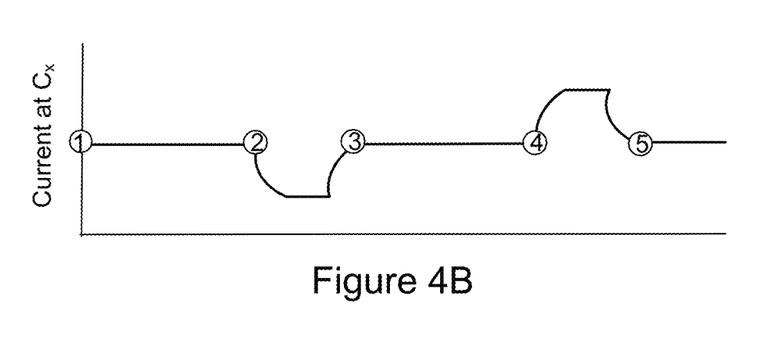
Figure 4C:
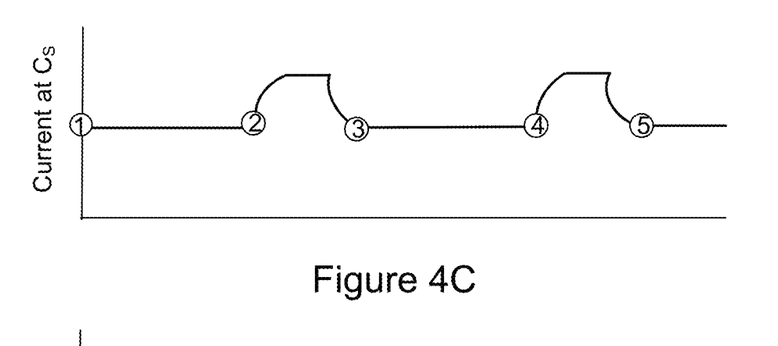

FIGS. 4A-D illustrate example waveforms at a measurement capacitor and integration capacitor over time for an example self-capacitance measurement. As described above, a touch or proximity input on the electrode of the touch sensor effects the amount of charge of measurement capacitor $C_X$. The amount of charge of measurement capacitor $C_X$ modifies the voltage at measurement capacitor $C_X$, such that the voltage at measurement capacitor $C_X$ is a reference voltage level $V_{REF}$ when NMOS transistor 36 is turned on prior to time point 1. As an example and not by way of limitation, reference voltage $V_{REF}$ at measurement capacitor $C_X$ is half a power supply voltage of the touch sensor at time point 1. In the example of FIG. 4C, the voltage at integration capacitor $C_S$ is an integration-reference voltage level at time point 1.

At time point 2, charge is applied to the measurement capacitor through current source 30 when PMOS transistor 38 is turned on, as illustrated in the example of FIG. 4B. In the example of FIG. 4A, charge applied by current source 30 for an amount of time modifies the voltage at measurement capacitor $C_X$ from the reference voltage level $V_{REF}$ to a first pre-determined voltage level. In particular embodiments, at time point 2, the first pre-determined voltage level at measurement capacitor $C_X$ after the application of charge is below reference voltage $V_{REF}$. At time point 3, when measurement capacitor $C_X$ stabilizes at the first pre-determined voltage level, the current at measurement capacitor $C_X$ returns to its original value, as illustrated in the example of FIG. 4B.

As described above, the capacitance of measurement capacitor $C_X$ depends at least in part on whether a touch or proximity input has occurred at the electrode of the touch sensor included in measurement capacitor $C_X$. As an example and not by way of limitation, in the presence of the touch or proximity input, the applied charge is divided between measurement capacitor $C_X$ and the capacitance between the finger and the electrode. The amount of charge applied to measurement capacitor $C_X$ to modify the voltage at measurement capacitor $C_X$ from reference voltage level $V_{REF}$ to the first pre-determined voltage level is higher compared with the amount of charge in the absence of the touch or proximity input on the electrode.

Figure 4D:
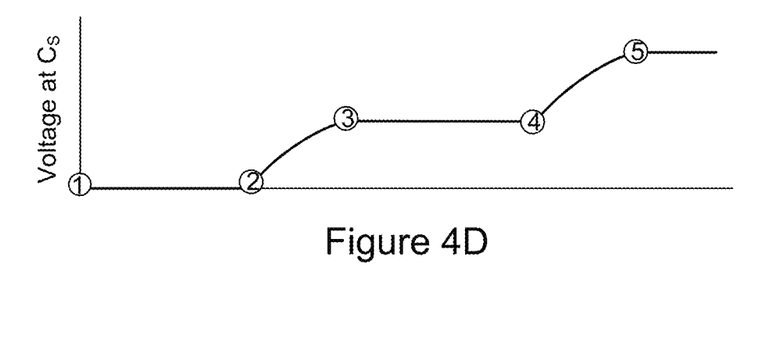

At time point 2, an amount of charge is applied to the integration capacitor $C_S$, as illustrated in the example of FIG. 4C. In particular embodiments, the amount of charge is applied to integration capacitor $C_S$ through current transmitted from the current amplifier, as illustrated in the example of FIG. 3. Moreover, the gain of the current amplifier may be inverted, such that the sign of the current applied to integration capacitor $C_S$ is opposite the sign of the current applied to measurement capacitor $C_X$, as illustrated in the example of FIGS. 4B-C. The amount of charge applied to integration capacitor $C_S$ is proportional to the amount of charge applied to measurement capacitor $C_X$ and the gain of the current amplifier. As illustrated in the example of FIG. 4D, the application of charge on integration capacitor $C_S$ modifies the voltage at integration capacitor $C_S$ from the integration-reference voltage level to a first charging voltage level at time point 3.

As illustrated in the example of FIG. 4A, at time point 4 charge is applied to measurement capacitor $C_X$ resulting in the voltage at measurement capacitor $C_X$ being modified from the first pre-determined voltage to a second pre-determined voltage. As an example and not by way of limitation, the second pre-determined voltage at measurement capacitor $C_X$ may be substantially equal to the reference voltage level $V_{REF}$. In the example of FIG. 4B, current is applied to measurement capacitor $C_X$ at time point 4. In particular embodiments, charge is applied to measurement capacitor $C_X$ through current from current source 32 when NMOS transistor 36 is turned on, as illustrated in FIG. 3. As described above, the amount of charge applied to integration capacitor $C_S$ is proportional to the amount of charge applied to measurement capacitor $C_X$. In particular embodiments, the amount of charge applied to integration capacitor $C_S$ is current transmitted by the current amplifier, as illustrated in the example of FIG. 3. As illustrated in the example of FIG. 4D, the application of charge on integration capacitor $C_S$ modifies the voltage at integration capacitor $C_S$ from the first charging voltage level to a second charging voltage level at time point 5.

A touch or proximity input at the electrode is determined relative to a calibration voltage difference between the integration-reference voltage level and the first charging level and between the first charging voltage level and second charging voltage level at integration capacitor $C_S$ in the absence of a touch or proximity input. In particular embodiments, low-frequency (LF) noise may corrupt the touch or proximity input detected through the electrode of the touch sensor. LF noise present in the difference measured at time points 2 and 3 and at time points 4 and 5 is observed as a LF offset common to each voltage difference between the reference voltage level $V_{REF}$ and the pre-determined voltage levels at measurement capacitor $C_X$. In particular embodiments, the LF noise offset of the self-capacitance measurement may be suppressed by inverting the current and associated noise component applied at integration capacitor $C_S$ through configuration of the current amplifier and summing the resulting change in voltage at integration capacitor $C_S$ with the second voltage difference at integration capacitor $C_S$. Although this disclosure describes and illustrates a particular voltage differences measured by the self-capacitance measurement circuit, this disclosure contemplates any suitable voltage differences measured by the self-capacitance measurement circuit, including such as for example a pre-determined voltage level that is higher than the reference voltage level.

Figure 5:
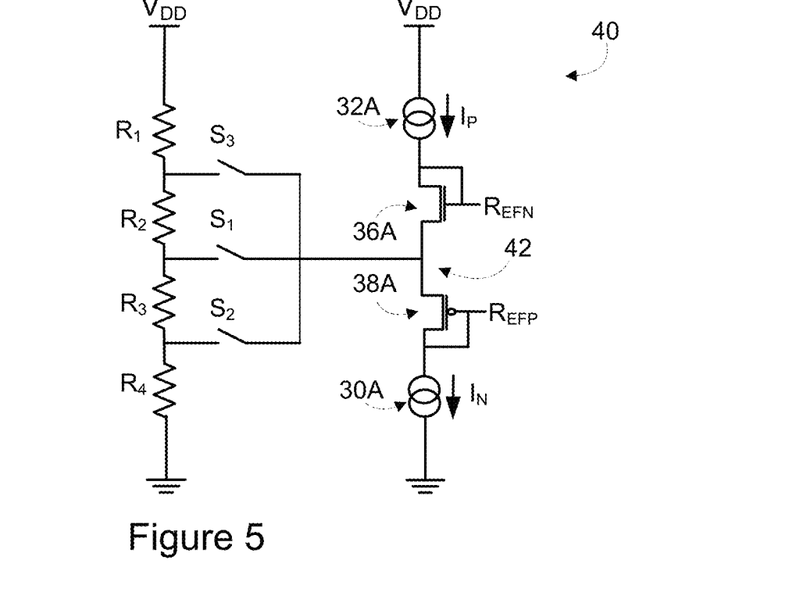
FIG. 5 illustrates an example circuit schematic of an example bias circuit for self-capacitance measurements.

FIG. 5 illustrates an example circuit schematic of an example bias circuit for self-capacitance measurements. In particular embodiments, the currents applied to the measurement capacitor of the self-capacitance measurement circuit are generated by a bias circuit 40. Bias circuit 40 includes a voltage divider formed with resistors $R_1$-$R_4$ coupled in series between supply voltage $V_{DD}$ and ground. Current source 32A configured to generate current $I_P$ is coupled to supply voltage $V_{DD}$ and diode-connected NMOS transistor 36A. Current source 30A configured to generate current $I_N$ is coupled to ground and diode-connected PMOS transistor 38A.

An input node 42 is formed by the source of NMOS transistor 36A and the drain of PMOS transistor 38A. Input node 42 is coupled to the voltage divider through switches $S_1$-$S_3$. In particular embodiments, the voltage at input node 42 may be set to the reference voltage level by closing switch $S_1$ coupled to a node between resistors $R_2$-$R_3$. As an example and not by way of limitation, depending on the values of resistors $R_1$-$R_4$, the reference voltage level may be half of the supply voltage $V_{DD}$. The voltage at input node 42 is set to a voltage higher than the reference voltage level by closing switch $S_3$ coupled to the node between resistors $R_1$-$R_2$ or a voltage lower than the reference voltage level by closing switch $S_2$ coupled to the node between resistors $R_3$-$R_4$. Although this disclosure describes and illustrates a particular arrangement of particular components for the bias circuit, this disclosure contemplates any suitable arrangement of any suitable components for a bias circuit. Moreover, this disclosure contemplates any suitable voltages for generating the currents for the bias and self-capacitance circuits, where appropriate.

In particular embodiments, currents $I_N$ and $I_P$ of the self-capacitance measurement circuit in the example of FIG. 3 tracks currents $I_N$ and $I_P$ generated by current sources 30A and 32A, respectively, of the bias circuit 40. Currents $I_N$ and $I_P$ generated by current sources 30A and 32A, respectively, are a function of the voltage at input node 42. When the voltage at input node 42 is modulated, the value of currents $I_N$ and $I_P$ track the modulation of the voltage at input node 42. The voltage at the measurement capacitor $C_X$ of the self-capacitance measurement circuit in the example of FIG. 3 tracks the voltage at the input node 42 through currents $I_N$ and $I_P$ generated by current sources 30A and 32A, respectively. In the example of FIG. 3, currents $I_N$ and $I_P$ modify the amount of charge of measurement capacitor $C_X$ to track modulation of the voltage of input node 42. In equilibrium, currents $I_N$ and $I_P$ in the self-capacitance measurement circuit are substantially equal to currents $I_N$ and $I_P$ in bias circuit 40 and the voltage at measurement capacitor $C_X$ is substantially equal to the modulated voltage at input node 42.

As described above, the voltage of measurement capacitor $C_X$ may be initially set to a reference voltage level. As an example and not by way of limitation, switch $S_1$ may be closed, thereby setting the reference voltage level to the voltage at input node 42. The voltage at measurement capacitor $C_X$ may be modulated from the reference voltage level to a first pre-determined voltage. As an example and not by way of limitation, the voltage at input node 42 is set to the first pre-determined voltage level by opening switch $S_1$ and closing switch $S_2$, thereby setting the first pre-determined voltage level lower than the reference voltage level. The voltage at tracks the modulated voltage of input node 42, resulting in a voltage at measurement capacitor $C_X$ that is below the reference voltage level, as illustrated in the example of FIG. 4B. As illustrated in the example of FIG. 4A, the voltage on measurement capacitor $C_X$ may be further modulated from the first pre-determined voltage level to a second pre-determined voltage level. As an example and not by way of limitation, the voltage at input node 42 is set to the first pre-determined voltage level by opening switch $S_2$ and closing switch $S_1$, thereby setting the voltage at input node 42 to the second pre-determined voltage level. In particular embodiments, the second pre-determined voltage level is substantially equal to the reference voltage level.

Figure 6:
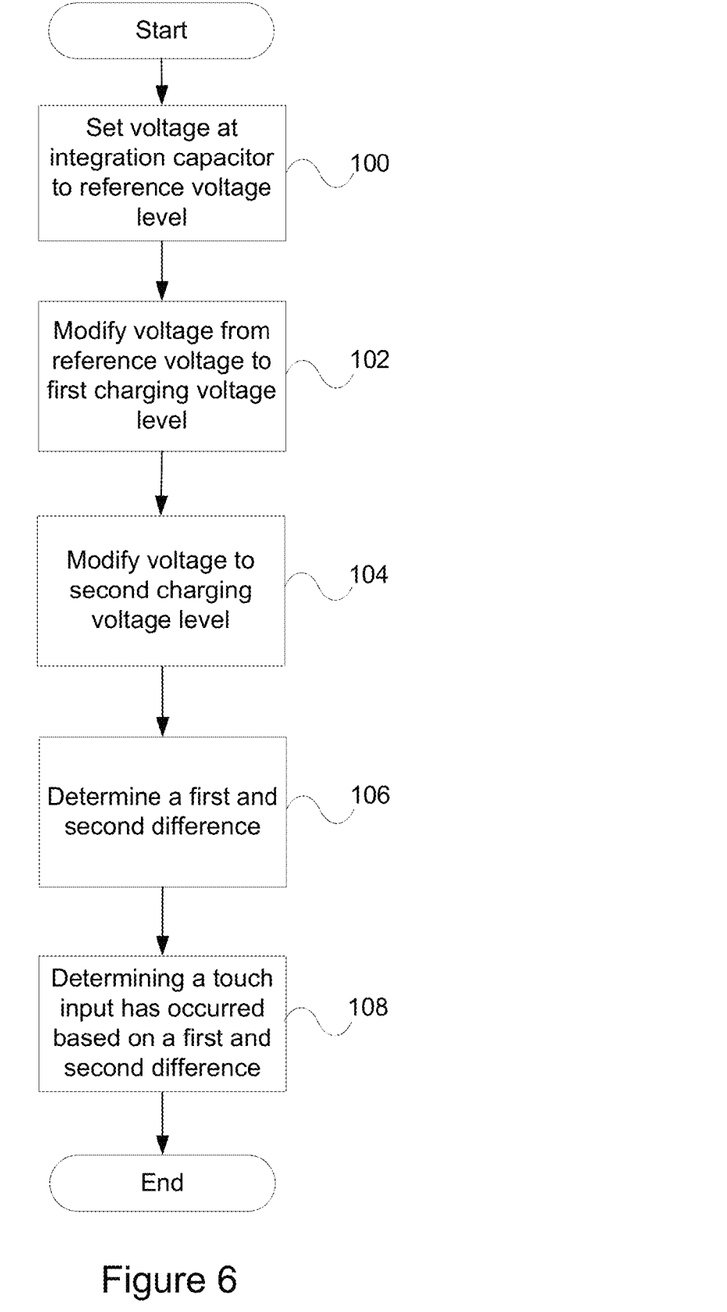
FIG. 6 illustrates an example method for self-capacitance measurements.

FIG. 6 illustrates an example method for self-capacitance measurements. The method may start at step 100, where a voltage at an integration capacitor is set. In particular embodiments, the voltage at the integration capacitor is set to a integration-reference voltage level. Step 102 modifies the voltage at the integration capacitor from the integration-reference voltage level to a first charging voltage level. The modification of the voltage at the integration capacitor results from application of a first amount of charge to the integration capacitor. The first amount of charge is proportional to an amount of charge that modifies a voltage at a capacitance of a touch sensor from a reference voltage level to a first pre-determined voltage level. At step 104, the voltage at the integration capacitor is modified from the first charging voltage level to a second charging voltage level. The modification of the voltage at the integration capacitor results from application a second amount of charge to the integration capacitor. The second amount of charge is proportional to an amount of charge modifying a voltage at the capacitance from the first pre-determined voltage level to a second pre-determined voltage level. Step 106 determines a first difference between the integration-reference voltage level and the first charging voltage level and a second difference between the first charging voltage level and the second charging voltage level. At step 108, whether a touch input to the touch sensor has occurred is determined based on the first and second differences, at which point the method may end. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components carrying out particular steps of the method of FIG. 6, this disclosure contemplates any suitable combination of any suitable components carrying out any suitable steps of the method of FIG. 6.

Herein, reference to a computer-readable storage medium encompasses one or more non-transitory, tangible computer-readable storage media possessing structure. As an example and not by way of limitation, a computer-readable storage medium may include a semiconductor-based or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    setting a voltage at an integration capacitor to an integration-reference voltage level;
    modifying the voltage at the integration capacitor from the integration-reference voltage level to a first charging voltage level, the modification of the voltage at the integration capacitor resulting from application of a first amount of charge to the integration capacitor, the first amount of charge being proportional to an amount of charge modifying a voltage at a capacitance of a touch sensor from a reference voltage level to a first pre-determined voltage level;
    modifying the voltage at the integration capacitor from the first charging voltage level to a second charging voltage level, the modification of the voltage at the integration capacitor resulting from application of a second amount of charge to the integration capacitor, the second amount of charge being proportional to an amount of charge modifying a voltage at the capacitance from the first pre-determined voltage level to a second pre-determined voltage level;

determining a first difference between the integration-reference voltage level and the first charging voltage level and a second difference between the first charging voltage level and the second charging voltage level; and determining whether a touch input to the touch sensor has occurred based on the first and second differences.

2. The method of claim 1, wherein modifying the voltage at the capacitance comprising applying to the capacitance a first current for a first amount of time and a second current for a second amount of time.

3. The method of claim 2, wherein the first and second currents are determined at least in part by the first and second pre-determined voltage levels.

4. The method of claim 2, wherein the first and second currents have opposite polarities with respect to the capacitance.

5. The method of claim 1, further comprising inverting a current amplifier gain to invert the first or second difference.

6. The method of claim 1, wherein the voltage at the capacitance substantially tracks a voltage at a node of a bias circuit.

7. The method of claim 1, wherein the second pre-determined voltage level is substantially equal to the reference voltage.

8. A computer-readable non-transitory storage medium embodying logic configured when executed to:

set a voltage at an integration capacitor to an integration-reference voltage level;

modify the voltage at the integration capacitor from the integration-reference voltage level to a first charging voltage level, the modification of the voltage at the integration capacitor resulting from application of a first amount of charge to the integration capacitor, the first amount of charge being proportional to an amount of charge modifying a voltage at a capacitance of a touch sensor from a reference voltage level to a first pre-determined voltage level;

modify the voltage at the integration capacitor from the first charging voltage level to a second charging voltage level, the modification of the voltage at the integration capacitor resulting from application of a second amount of charge to the integration capacitor, the second amount of charge being proportional to an amount of charge modifying a voltage at the capacitance from the first pre-determined voltage level to a second pre-determined voltage level;

determine a first difference between the integration-reference voltage level and the first charging voltage level and a second difference between the first charging voltage level and the second charging voltage level; and determine whether a touch input to the touch sensor has occurred based on the first and second differences.

9. The medium of claim 8, wherein the logic is further configured to apply to the capacitance a first current for a first amount of time and a second current for a second amount of time.

10. The medium of claim 9, wherein the first and second currents are determined at least in part by the first and second pre-determined voltage levels.

11. The medium of claim 9, wherein the first and second currents have opposite polarities with respect to the capacitance.

12. The medium of claim 8, wherein the logic is further configured to invert a current amplifier gain to invert the first or second difference.

13. The medium of claim 8, wherein the voltage at the capacitance substantially tracks a voltage at a node of a bias circuit.

14. The medium of claim 8, wherein the second pre-determined voltage level is substantially equal to the reference voltage.

15. A device comprising:

a measurement circuit; and a computer-readable non-transitory storage medium coupled to the measurement circuit and embodying logic configured when executed to:

set a voltage at an integration capacitor to an integration-reference voltage level;

modify the voltage at the integration capacitor from the integration-reference voltage level to a first charging voltage level, the modification of the voltage at the integration capacitor resulting from application of a first amount of charge to the integration capacitor, the first amount of charge being proportional to an amount of charge modifying a voltage at a capacitance of a touch sensor from a reference voltage level to a first pre-determined voltage level;

modify the voltage at the integration capacitor from the first charging voltage level to a second charging voltage level, the modification of the voltage at the integration capacitor resulting from application of a second amount of charge to the integration capacitor, the second amount of charge being proportional to an amount of charge modifying a voltage at the capacitance from the first pre-determined voltage level to a second pre-determined voltage level;

determine a first difference between the integration-reference voltage level and the first charging voltage level and a second difference between the first charging voltage level and the second charging voltage level; and determine whether a touch input to the touch sensor has occurred based on the first and second differences.

16. The device of claim 15, wherein the logic is further configured to apply to the capacitance a first current for a first amount of time and a second current for a second amount of time.

17. The device of claim 16, wherein the first and second currents are determined at least in part by the first and second pre-determined voltage levels.

18. The device of claim 16, wherein the first and second currents have opposite polarities with respect to the capacitance.

19. The device of claim 15, wherein the logic is further configured to invert a current amplifier gain to invert the first or second difference.

20. The device of claim 15, wherein the voltage at the capacitance substantially tracks a voltage at a node of a bias circuit.

* * * * *